United States Patent
Wang (10) Patent No.: US 6,401,159 B1
(45) Date of Patent: Jun. 4, 2002

(54) METHOD OF HALF-DUPLEX SERIAL SIGNAL CONTROL WITH MULTI-BAUD RATE AND MULTI-CONFIGURATION

(75) Inventor: Lee-Ming Wang, Taichung (TW)

(73) Assignee: ICP Das Co., Ltd., Hsinchu (TW)

( * ) Notice: Subject to any disclaimer, the term of this patent is extended or adjusted under 35 U.S.C. 154(b) by 0 days.

(21) Appl. No.: 09/015,248

(22) Filed: Jan. 29, 1998

(30) Foreign Application Priority Data

Jul. 20, 1997 (TW) ........................................ 86110451 A (51) Int. Cl.[7] ............................................. H04L 29/10
(52) U.S. Cl. ...................................................... 710/315
(58) Field of Search ................................ 370/466, 467, 370/468, 293, 297, 296, 295, 279, 419, 423, 463; 375/220, 222; 710/313, 314, 315

(56) References Cited

U.S. PATENT DOCUMENTS

| | | | |
|---|---|---|---|
| 4,884,287 A | * 11/1989 | Jones et al. | ........ 375/377 |
| 5,197,083 A | * 3/1993 | Gandini et al. | ........ 375/225 |
| 5,257,289 A | * 10/1993 | Jopson | ........ 375/257 |
| 5,390,038 A | * 2/1995 | Cecchini | ........ 359/113 |
| 5,539,787 A | * 7/1996 | Nakano et al. | ........ 375/377 |
| 5,956,523 A | * 9/1999 | Chen | ........ 395/882 |

* cited by examiner

*Primary Examiner*—Melvin Marcelo
*Assistant Examiner*—Soon-Dong Hyun
(74) *Attorney, Agent, or Firm*—Rabin & Berdo, P.C.

(57) ABSTRACT

A method and a device for half duplex serial signal control with multiple baud rates and multiple configurations comprises RS-232 interface circuit, RS-485 interface circuit, power circuit, protective circuit, and logical control circuit. A brand new controlling method is applied to the receiving/transmission signal control wire on the RS-485 interface circuit so that the programmable logic controllers (PLCs) in the two-wire RS-485 network can be set at different baud rates and different configurations for RS-232 communication. That is, programmable logic controllers (PLCs) from different manufacturers, using different communication speed can connect one another as well as a personal computer. A signal converter transforms the RS-232 interface signal to the RS-485 interface signal for each PLC, passes through the RS-485 signal in the two-wire RS-485 network, and finally transforms the RS-485 signal to RS-232 signal for the connected computer. A PC can therefore connect to PLCs from different manufacturers, using different communication speed. When the distance between each PLC is far apart, the two-wire RS-485 signal repeater in the present invention can extend the network and increase signal strength so that long distance communication is allowed.

12 Claims, 10 Drawing Sheets

LTC485

ABSOLUTE MAXIMUM RATINGS
(Note 1)
Supply Voltage .................................................... 12V
Control Input Voltages ................... −0.5V to $V_{CC}$ + 0.5V
Driver Input Voltage ....................... −0.5V to $V_{CC}$ + 0.5V
Driver Output Voltage ......................................... ±14V
Receiver Input Voltage ........................................ ±14V
Receiver Output Voltages ............. −0.5V to $V_{CC}$ + 0.5V
Operating Temperature Range
   LTC485I .................................. −40°C ≤ $T_A$ ≤ 85°C
   LTC485C ...................................... 0°C ≤ $T_A$ ≤ 70°C
   LTC485M ............................... −55°C ≤ $T_A$ ≤ 125°C
Lead Temperature (Soldering, 10 sec) ................. 300°C

PACKAGE/ORDER INFORMATION

| ORDER PART NUMBER |
|---|
| LTC485CJ8 |
| LTC485CN8 |
| LTC485CS8 |
| LTC485IN8 |
| LTC485IS8 |
| LTC485MJ8 |

| S8 PART MARKING |
|---|
| 485 |
| 485I |

J8 PACKAGE — 8-LEAD CERAMIC DIP
N8 PACKAGE — 8-LEAD PLASTIC DIP
S8 PACKAGE — 8-LEAD PLASTIC SOIC $T_{JMAX}$ = 155°C, $\theta_{JA}$ = 100°C/W (J)
$T_{JMAX}$ = 100°C, $\theta_{JA}$ = 130°C/W (N)
$T_{JMAX}$ = 100°C, $\theta_{JA}$ = 170°C/W (S)

FIG. 10A

LTC485

FUNCTION TABLES

LTC485 Transmitting

| INPUTS | | | LINE CONDITION | OUTPUTS | |
|---|---|---|---|---|---|
| $\overline{RE}$ | DE | DI | | B | A |
| X | 1 | 1 | No Fault | 0 | 1 |
| X | 1 | 0 | No Fault | 1 | 0 |
| X | 0 | X | X | Z | Z |
| X | 1 | X | Fault | Z | Z |

LTC485 Receiving

| INPUTS | | | OUTPUTS |
|---|---|---|---|
| $\overline{RE}$ | DE | A − B | R |
| 0 | 0 | ≥0.2V | 1 |
| 0 | 0 | ≤−0.2V | 0 |
| 0 | 0 | Inputs Open | 1 |
| 1 | 0 | X | Z |

PIN FUNCTIONS

| PIN # | NAME | DESCRIPTION |
|---|---|---|
| 1 | RO | Receiver Output. If the receiver output is enabled ($\overline{RE}$ low), then if A > B by 200mV, RO will be high. If A < B by 200mV, then RO will be low. |
| 2 | $\overline{RE}$ | Receiver Output Enable. A low enables the receiver output, RO. A high input forces the receiver output into a high impedance state. |
| 3 | DE | Driver Outputs Enable. A high on DE enables the driver output. A and B, and the chip will function as a line driver. A low input will force the driver outputs into a high impedance state and the chip will function as a line receiver. |
| 4 | DI | Driver Input. If the driver outputs are enabled (DE high), then a low on DI forces the outputs A low and B high. A high on DI with the driver outputs enabled will force A high and B low. |
| 5 | GND | Ground Connection. |
| 6 | A | Driver Output/Receiver Input. |
| 7 | B | Driver Output/Receiver Input. |
| 8 | $V_{CC}$ | Positive Supply; 4.75 < $V_{CC}$ < 5.25 |

FIG. 10B

METHOD OF HALF-DUPLEX SERIAL SIGNAL CONTROL WITH MULTI-BAUD RATE AND MULTI-CONFIGURATION

FIELD OF THE INVENTION

The present invention relates to a method and a device for half-duplex serial signal control with multibaud rates and multiconfigurations and, more specifically to a method and a device for half-duplex serial signal control with multibaud rates and multiconfigurations used on a network among at least one computer and other equipments from different manufacturers and using different communication speeds.

BACKGROUND OF THE INVENTION

It is known that RS-232 communicates with a series of serial signals. In order to send a byte, several parts of the following are included:
start bit+data bit+parity bit+stop bit where start bit=1 bit
    data bit=7 bits or 8 bits
    parity bit=0 bit or 1 bit
    stop bit=1 bit or 2 bits The shortest length of the serial signal is 9 (=1+7+0+1) bits while the longest is 12 (=1+8+1+2). There are four possible configurations of the signal being sent: 9, 10, 11, and 12 bits. In practical applications, there is no preferred configuration. So the default configuration for data transmission among products made by each manufacturer might be different. The number of bytes transmitted in one second is called the baud rate. The specifications of baud rate differ among different equipment. The baud rate adopted by each manufacturer might not be the same and there is no universal agreement on baud rate in the industry. These limitations altogether make the networking between a PC and PLCs difficult. It is desirable to use the same products and the same communication speed.

By half-duplex communication, it means that the host computer and other equipment or instruments connected cannot receive and transmit at the same time. The data transmission is done in the request and answer fashion. The host computer sends an instruction and the equipment or instruments return a result. The activity of transmission and the activity of receiving cannot happen at the same time.

In the current industry, there are a lot of equipment or instruments that can be controlled via programmable logic controllers (PLC). In response to the demand for full automation, there is a need to link these PLCs in a network. PLCs usually come with RS-232 interface which can be configured to different addresses. They are qualified to link to one another in a network.

Figure 1:
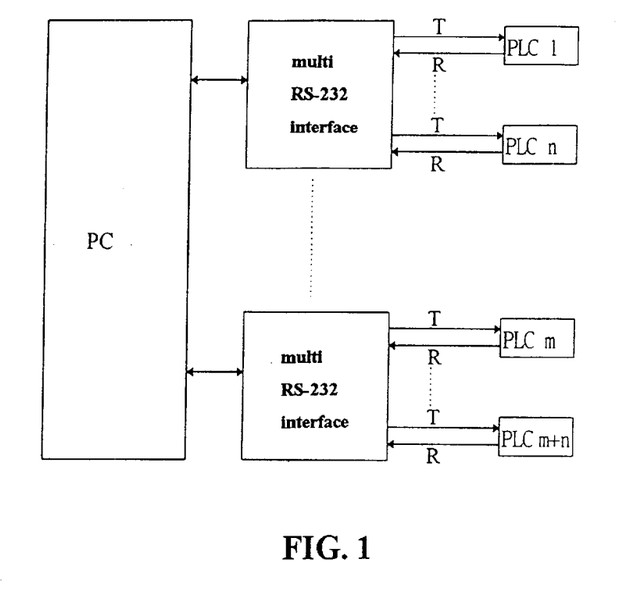
FIG. 1 shows the schematics of connecting several programmable logic controllers with multi RS-232 interface.

FIG. 1 shows the schematics of connecting several programmable logic controllers with multi RS-232 interface. A PC can use the RS-232 interface which has multiports to connect several PLCs. The PC can switch among the RS-232 ports so that at any moment, there is only one PLC that can communicate with the PC and each PLC can be controlled when the corresponding RS-232 port is selected in turns. The major drawback of this type of connection is the high cabling cost and the difficulty in system maintenance. The area of a factory is usually large, so the PLCs might be located far apart from each other. If all the PLCs are connected to the PC, lots of cables and hence the capital will be needed. With the cables hanging around in the factory, the system maintenance becomes more difficult.

Figure 2:
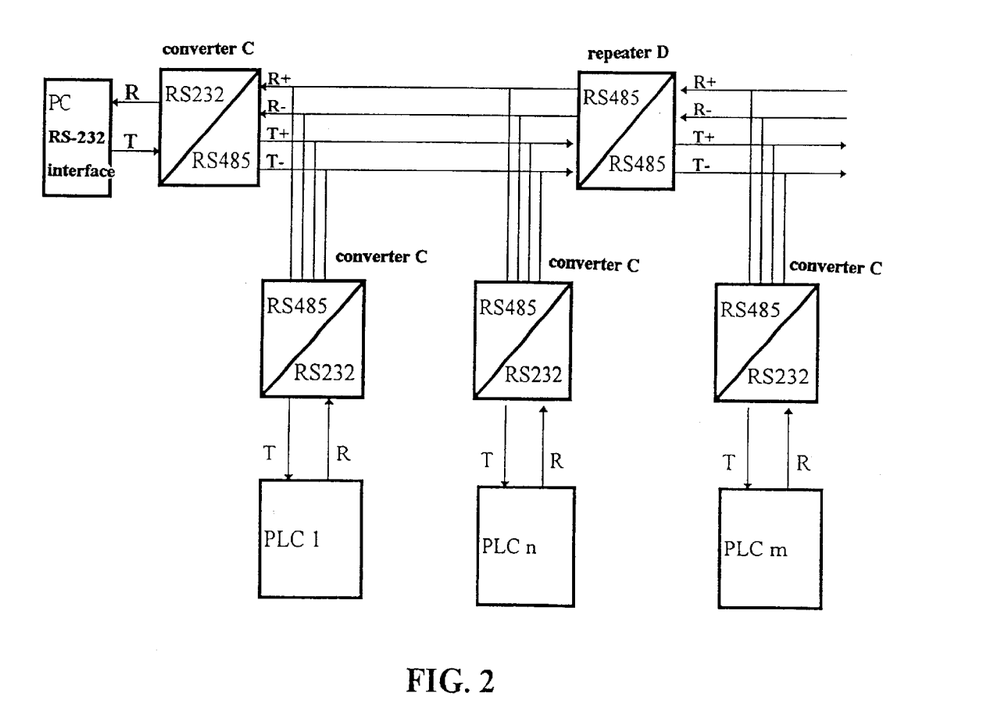
FIG. 2 shows the schematics of connecting several programmable logic controllers with four-wire RS-485 interface.

FIG. 2 shows the schematics of connecting several programmable logic controllers with a four-wire RS-485 interface. A converter which works between RS-232 and four-wire RS-485 is used. The connection between the PC and the PLCs is done by four RS-485 wires. With this setup, both the cabling cost and the difficulty in system maintenance will be significantly reduced compared to the setup in FIG. 1. Each PLC in FIG. 2 responds only when the received instruction matches its address. If the PC sends an instruction to address #1, all the PLCs receive this instruction but only PLC#1 responds. Because only PLC#1 has the address #1, others do not. Similarly, the PC can send messages to #2, #3 É#m respectively, so all the PLCs can be controlled.

Figure 3:
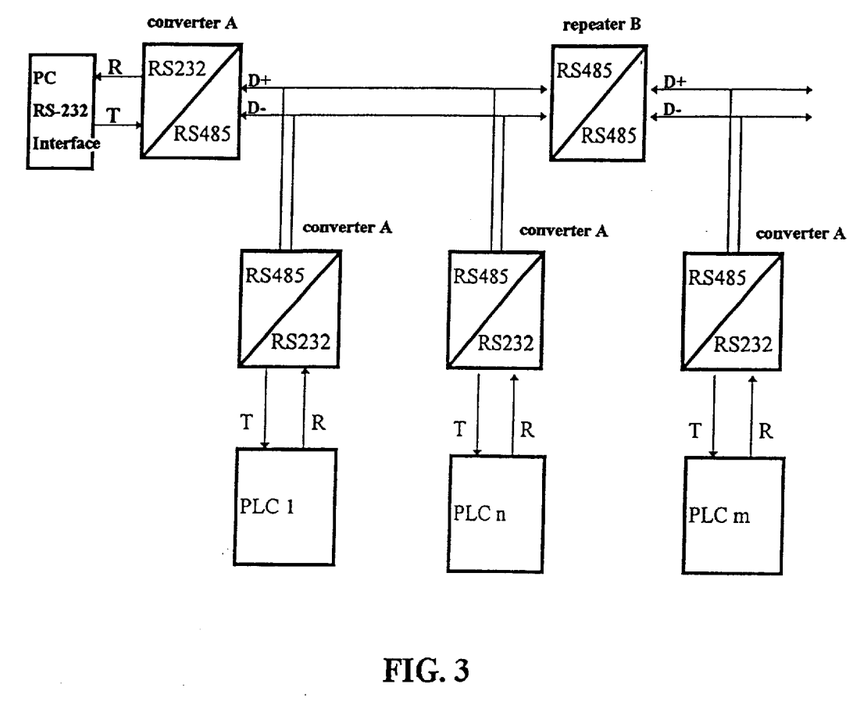
FIG. 3 shows the schematics of connecting several programmable logic controllers with two-wire RS-485 interface.

FIG. 3 shows the schematics of connecting several programmable logic controllers with a two-wire RS-485 interface. A converter which works between RS-232 and two-wire RS-485 is used. The connection between the PC and the PLCs is done by only two RS-485 wires. With this setup, the cost of cabling and the cost of system maintenance can be reduced by half, in comparison with FIG. 2. The operation principle in FIG. 3 is similar to that in FIG. 2. The main difference is that in FIG. 2, T+ and T− send instructions while R+ and R− receive. In FIG. 3, D+ and D− can be used to send and receive. The RS-232/RS-485 converter and the RS-485 repeater in FIG. 3 are more complicated than those in FIG. 2. If the PLCs use a different baud rate and configuration, the RS-232/RS-485 converter and the RS-485 repeater can hardly do their job. This is why instruments or equipment from different manufacturers have problems in networking, especially if they are not purchased at the same time. For the time being, problems remain when using converters and repeaters in the above setup, no matter whether they are domestically manufactured or imported.

Accordingly, applicants have developed a method and a device for half-duplex serial signal control with multibaud rates and multiconfiguration.

SUMMARY OF THE INVENTION

In one form of the present invention, a method for half-duplex serial signal control with multibaud rates and multi-configuration is proposed. A new controlling approach utilizing the receiving/transmission signal control wire on the interface circuit is used on the network having multibaud rates and multiconfiguration. Instruments or equipments from different manufacturers can therefore connect to one another.

In another form of the present invention, a system for half-duplex serial signal control with multibaud rates and multiconfiguration includes a power circuit a, protective circuit a, RS-232 interface circuit a, RS-485 interface circuit and a logical control circuit. The serial signal is converted between the RS-232 and RS-485 interfaces in order to receive, transmit and repeat signals using only D+ and D− wires in the two-wire RS-485 network. A brand new method is used to regulate the signal in the receiving/transmission signal control wire on the interface circuit so that multibaud rates and multiconfiguration are allowed on the network. Instruments or equipment from different manufacturers or using different communication speed can thus connect with each other. The cost and the difficulty in maintenance can both be reduced.

With the traditional networking, PLCs from different manufacturers might have different baud rates and different configurations. Instead of two-wire RS-485, four-wire RS-485 is needed. The cost for material and maintenance which is significantly increased by at least double burdens the end users. The most important technical advantage of the present invention includes a new control approach which allows the PLCs on a two-wire RS-485 to have different baud rates and different configurations for RS-232 communication.

Other important technical advantages are readily apparent to one skilled in the art from the following figures, descriptions, and claims.

BRIEF DESCRIPTION OF THE DRAWINGS

For more complete understanding of the present invention, and for further features and advantages, reference is now made to the following description taken in conjunction with the accompanying drawings, in which:

FIGS. 10A and 10B shows the specifications of the traditional RS-485 interface IC.

DETAILED DESCRIPTION OF THE INVENTION

Figure 4:
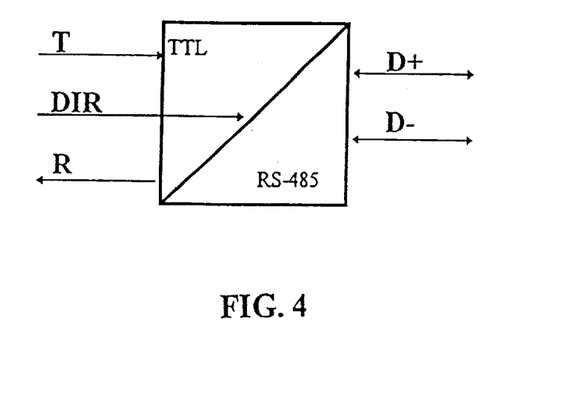
FIG. 4 shows the schematics of RS-485 interface circuit.

If all the PLCs in FIG. 3 use the same baud rates and configuration, both converter A and repeater B which are traditional operation principle is explained as followed. The schematics of a RS-485 interface circuit is shown in FIG. 4. When the receiving/transmission signal control wire (DIR) is LOW, which means the interface is going to receive data from the RS-485 network, data on D+ and D− will thus be directed to R. When DIR is HIGH, which means the interface is going to send data to the RS-485 network, data on T will thus be directed to D+ and D−. The functions of the receiving/transmission signal control wire (DIR) are summarized as followed:

| status | function description |
| --- | --- |
| DIR=LOW | (D+, D−) are directed to R in order to receive data from the RS-485 network |
| DIR=HIGH | T is directed to (D+, D−) in order to send data to the RS-485 network |

From the table, it is obvious that when DIR is LOW, data receiving from the network will be activated; when DIR is HIGH, data transmission to the network will be activated.

Figure 5A:
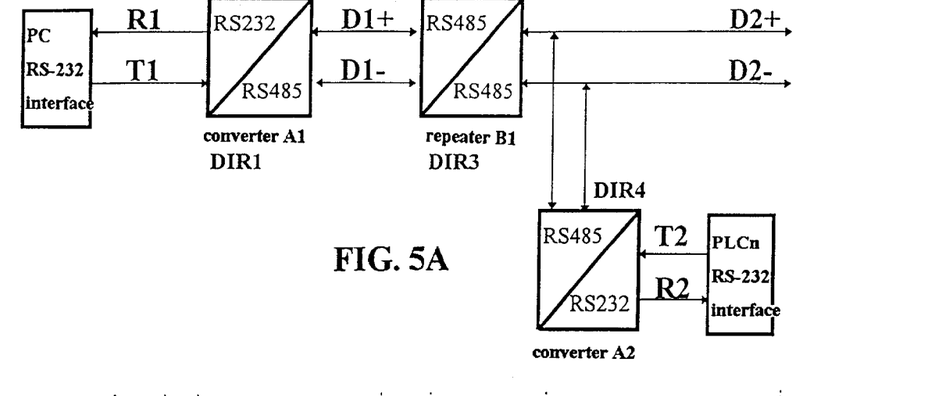
FIGS. 5A and 5B shows the block diagrams and the signal sequences of the traditional connection between PC and PLC.
Figure 5B:
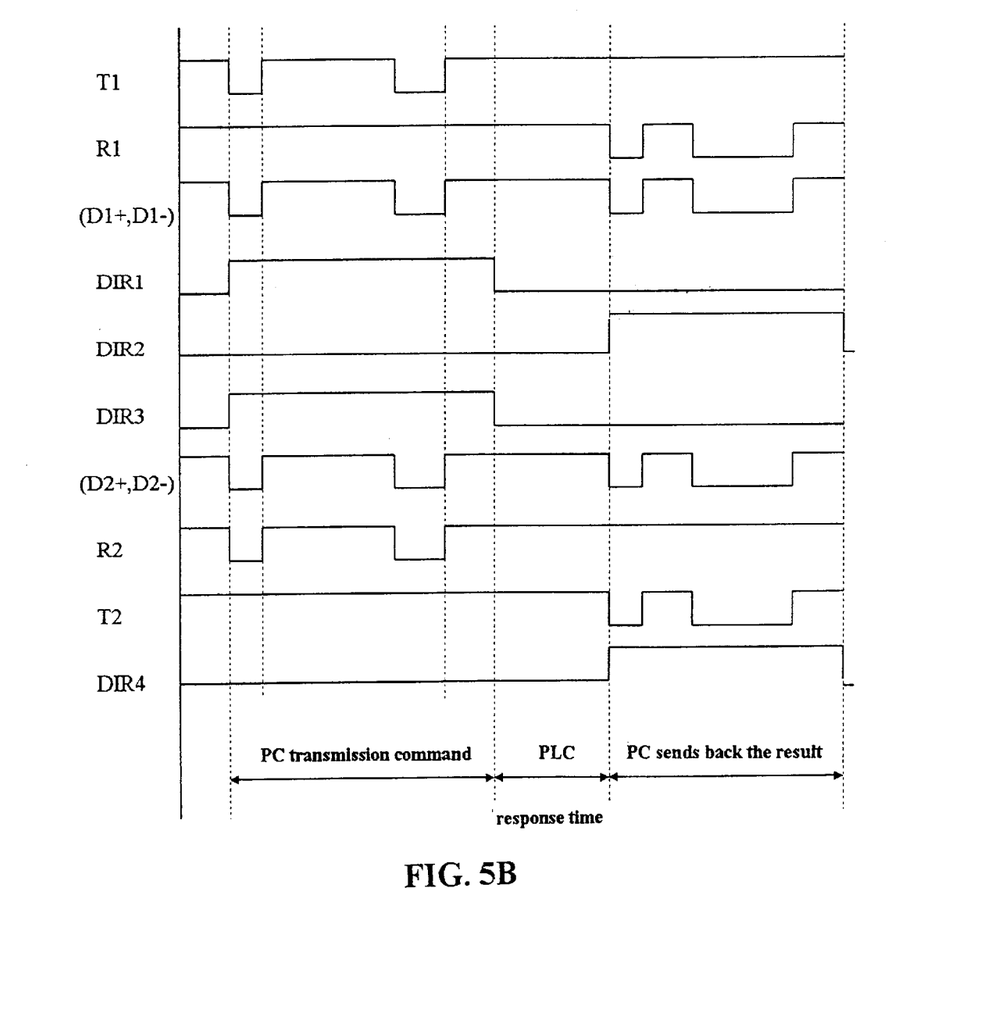

FIGS. 5A and 5B shows the block diagrams and the signal sequences of the traditional connection between the PC and PLCs. At the start of the communication, DIR1, DIR2, DIR3, and DIR4 are LOW i.e. they are ready to receive data.

When the PC sends the instruction, T1 goes from HIGH to LOW simultaneously and the data transmission starts right away. Meanwhile, DIR1 goes from LOW to HIGH, which means it is ready to transmit data, so that (D1+, D1−) starts to send the data from T1. DIR2 remains LOW to receive data on (D1+, D−), which is originally from T1. Then DIR3 rises from LOW to HIGH, being ready for data transmission. It is clear that (D2+, D2−)=(D1+, D1−)=T1. DIR4 remains in LOW to receive data on (D2+, D2−), which is originally from T1. Therefore, R2=(D2+, D2−)=(D1+, D1−)=T1, which means the instruction sent from the T1 on the PC has been successfully passed to R2.

In order to further clarify the data transmission sequence, the receiving and transmission activities between the PC and the PLCs are summarized as follows:

While the above sequences is from PC to PLC, the following is from PLC back to PC:

Whenever there is an RS-485 interface, there is a need for the receiving/transmission signal control wire (DIR). Converter A1 and A2 both have an RS-485 interface and their receiving/transmission signal control wires are DIR1 and DIR4 respectively. Repeater B1 has two RS-485 interfaces which are labelled DIR2 and DIR3. DIR1, DIR2, DIR3, and DIR4 in FIG. 5A are the most important controlling wires in the whole system.

It is shown that DIR1 and DIR3 go from LOW to HIGH, and therefore DIR1 and DIR3 go from HIGH back to LOW after T1 finishes data transmission. DIR1 and DIR3 need to go from HIGH back to LOW so that data receiving is activated. In this instance, it is assumed a that PLCn uses fix baud rates and configuration and the data on T1 is one byte long. If the baud rates=100000 bit/sec and configuration=10 bits, the duration of data on T1=10×1/10000 sec=1/1000 sec. Hardware counters or retarders can be used to set the time telling when DIR1 and DIR3 can go from HIGH back to LOW again.

If the instruction is one byte long, PLCn will respond right after the data on T1 is received. After T1 finishes transmission, DIR1 and DIR3 go from HIGH to LOW while DIR2 and DIR4 are already in LOW, waiting for data receiving. When PLCn needs to send data via T2, DIR2 and DIR4 will go from LOW to HIGH and data on T2 will be sent, which makes (D2+, D2−)=T2. Because DIR3 is LOW and DIR2 is HIGH, so (D1+, D1−)=(D2+, D2−)=T2. DIR1 is also in LOW, being ready to receive data. Finally, R1= (D1+, D1−)=(D2+, D2−)=T2, which means data from PLCn is successfully sent to R1 on the PC. After T2 finishes data transmission, DIR2 and DIR4 will go from HIGH to LOW, which is similar to the case DIR1 and DIR3 go from HIGH to LOW.

The aforementioned example regards the receiving and transmission of one byte. But if the data being received or transmitted is more than one byte long, after one byte communication has finished, DIR1, DIR2, DIR3, and DIR4 will return to their original state. Because PLCn receives only one byte, it will not respond and the next byte can be sent. This process continues until the whole instruction is sent. When PLCn identifies the instruction, it sends back the result. The process of sending back, which is similar to that of sending out, continues with one byte sent after another. Because the system will go back to the initial state every time when one byte is successfully sent, there is no limit on the number of bytes being sent.

It is shown that converter A1, A2 and repeater B1 in FIG. 5A can be worked out, as long as all the PLCs use the same baud rate and configuration. If the PLCs use different baud rates or different configurations, the duration of sending one byte becomes uncertain and only the PC knows exactly how long the duration is because the PC can only control the converter A1 which is directly connected to the PC. Converter A2 and repeater B1 can't be controlled by the PC and therefore will not know the duration of the data. This altogether makes the timing of HIGH/LOW transition in DIR2, DIR3, and DIR4 irrelevant and the data being transmitted and received will be misinterpreted. This is why equipment from the same manufacturer, using the same communication speed are needed traditionally so that the same baud rates and configuration on the network can be achieved. But in practical use, the requirement is also hard to reach and hence results in a bottleneck in practical networking.

The present invention proposes a brand new controlling method so that all the PLCs in FIG. 3 can use different baud rates and configurations.

Figure 6A:
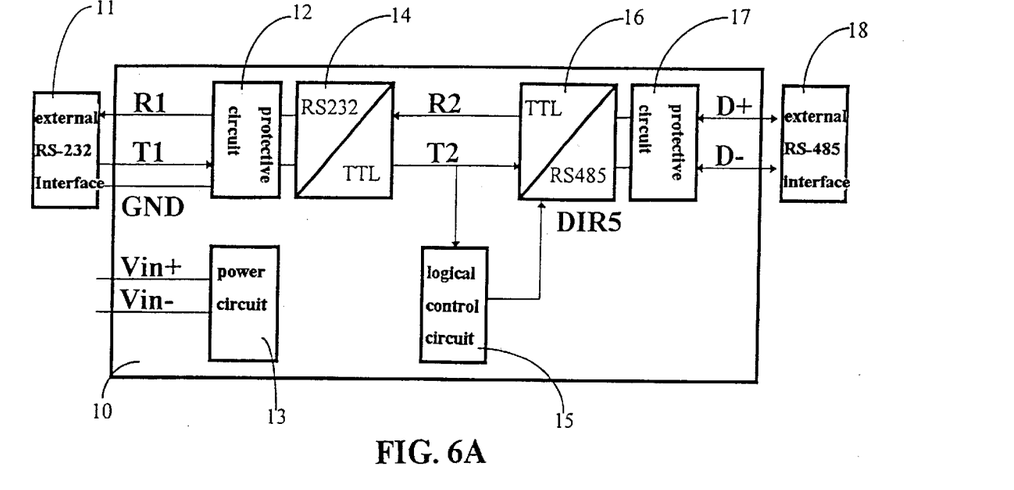
FIGS. 6A and 6B shows the block diagrams and the signal sequences of the converter in the present invention.

FIG. 6A shows the block diagrams of the converter in the present invention. A signal converter between RS-232 and two-wire RS-485 comprises protective circuit 12, power circuit 13, RS-232/TTL interface circuit 14, logical control circuit 15, TTL/RS-485 interface circuit 16, protective circuit 17. The converter transforms the interface signal between external RS-232 interface 11 and external RS-485 interface 18. Power circuit 13 transforms the external power (Vin+, Vin−) to the power needed by the hardware. Protective circuit 12 and 17 connect external RS-232 interface 11 and external RS-485 interface 18 respectively so that noise, shock, and overload can be prevented. RS-232/TTL interface circuit 14 connects protective circuit 12, logical control circuit 15, and TTL/RS-485 interface circuit 16. It is used to convert the RS-232 signal on R1 and T1 to the TTL signal on R2 and T2 in order to work with logical control circuit 15 which controls the signals in receiving/transmission signal control wire DIR5, based on the data in T2. TTL/RS-485 interface circuit 16 transforms TTL interface signal on R2 and T2 to RS-485 interface signal on D+ and D− which will be used by the external RS-485 interface.

Figure 6B:
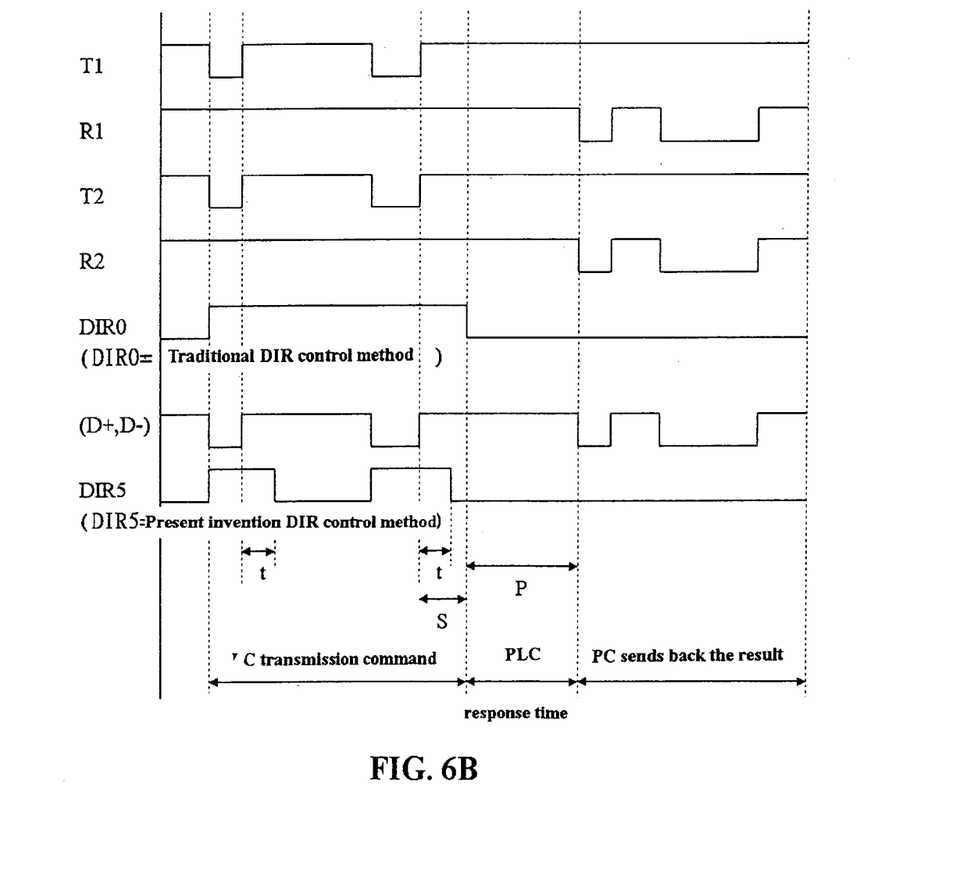

The operation principle is as followed in FIG. 6B which shows, the schematics of sequences when sending data on T1. When the data on T1 goes from HIGH to LOW and the receiving/transmission signal control DIR0 goes from LOW to HIGH, being ready for data transmission, (D2+, D1−) send out the data on T1. When the transmission is complete, DIR0 goes from HIGH back to LOW again. This is the traditional fashion.

The new controlling method in the present invention uses an extra receiving/transmission signal control wire (DIR5). The operation principle is as followed:

Rule on starting transmission: at the start, the sequence in the receiving/transmitting data control line (DIR5) is LOW;

Rule on transmission of LOW: when transmitting LOW signals, that is when the sequence of T1 changes from HIGH to LOW, the sequence in the receiving/transmitting data control line (DIR5) goes from LOW to HIGH;

Rule on transmission of HIGH: when transmitting HIGH signals, that is when the sequence of T1 changes from LOW to HIGH, the sequence in the receiving/transmitting data control line (DIR5) goes from HIGH to LOW after a time delay t;

Rule on starting transmission makes sure that the system is a data receiving mode. Rule on transmitting LOW makes sure that DIR5 becomes HIGH before sending LOW signals. Rule on transmitting HIGH makes DIR5 stay HIGH for a period of time, t, to wait for hardware prorogation delay then goes from HIGH to LOW; During the period and after, (D1+, D1−) remains in HIGH. The period t is related to the characteristics of RS-485 interface IC and is irrelevant to the baud rates and configurations of the PC and the PLCs. While receiving data, DIR5 remains in LOW. Due to that rules on starting transmission, transmitting LOW, and transmitting HIGH are irrelevant to the baud rates and configurations of the PC and the PLCs, when utilizing the present invention in the system shown in FIG. 3, the PC and other PLCs are allowed to use different baud rates and configurations.

Figure 7:
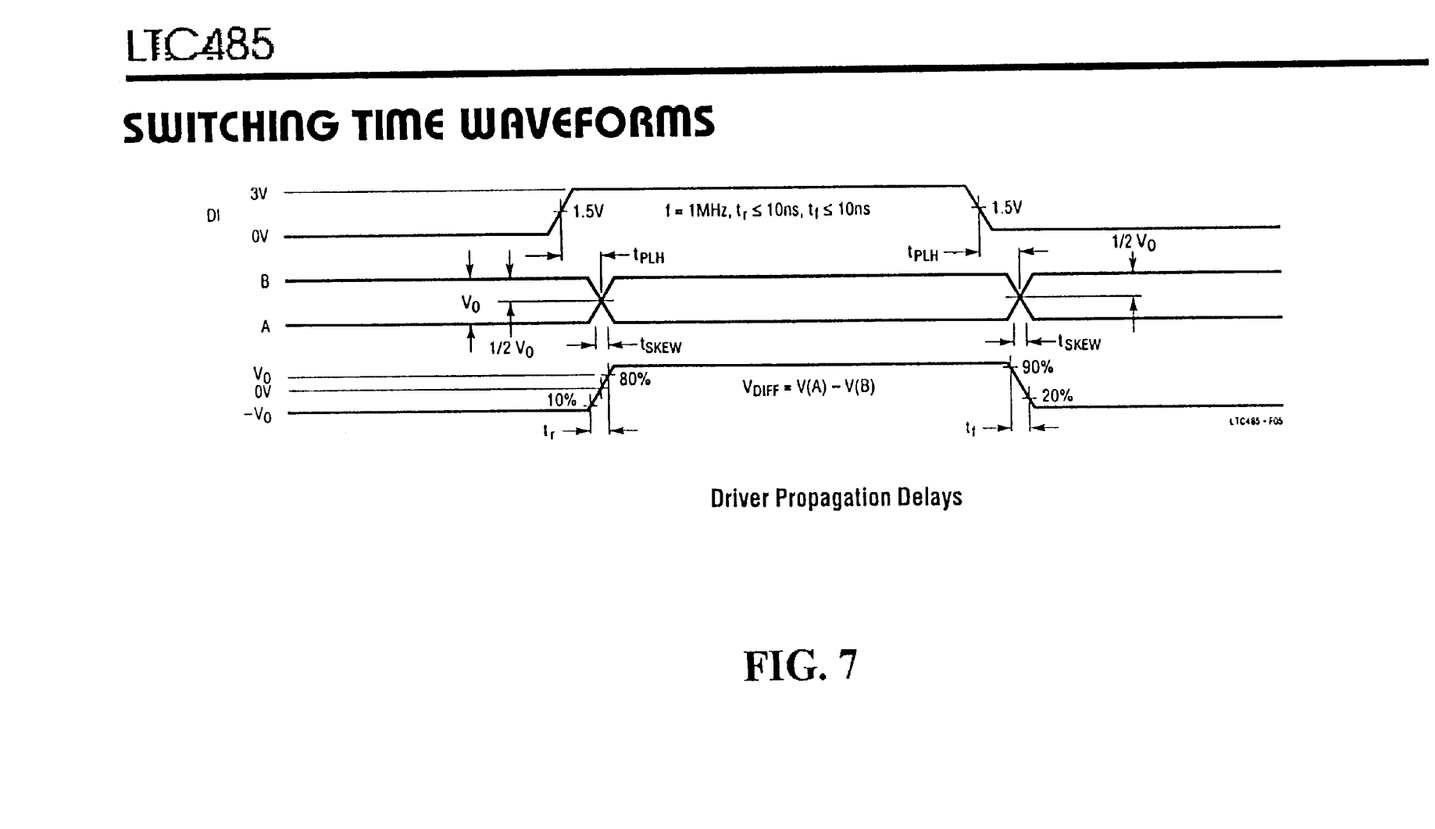
FIG. 7 shows the signal sequences of the traditional RS-485 interface IC.

The duration of t is related to the characteristics of the interface IC being used. Take the LTC485 interface IC which is widely used in the industry for example, the duration of t should be equal to or larger than 100 ns which is the value of driver propagation delay (tPLH) shown in FIG. 7. In other words, t should be equal to or larger than 100 ns=0.1 μs. In FIG. 6B, s is the length of the stop bit, p is the PLC response time, and t can be as long as the length of the stop bit s. Assuming the transmission speed of the RS-232 interface is 100 KHz, then s is 1/100 K=10 μs and t must lie between 0.1 μs and 10 μs. If the stop bit is two bytes long, longer t, say 10*2=20 μs, is needed. When the PLC gets the instruction, it requires processing time, the so called response time p.

After the process time, the PLC sends back the result. Therefore, t can be as long as s+p.

Figure 8A:
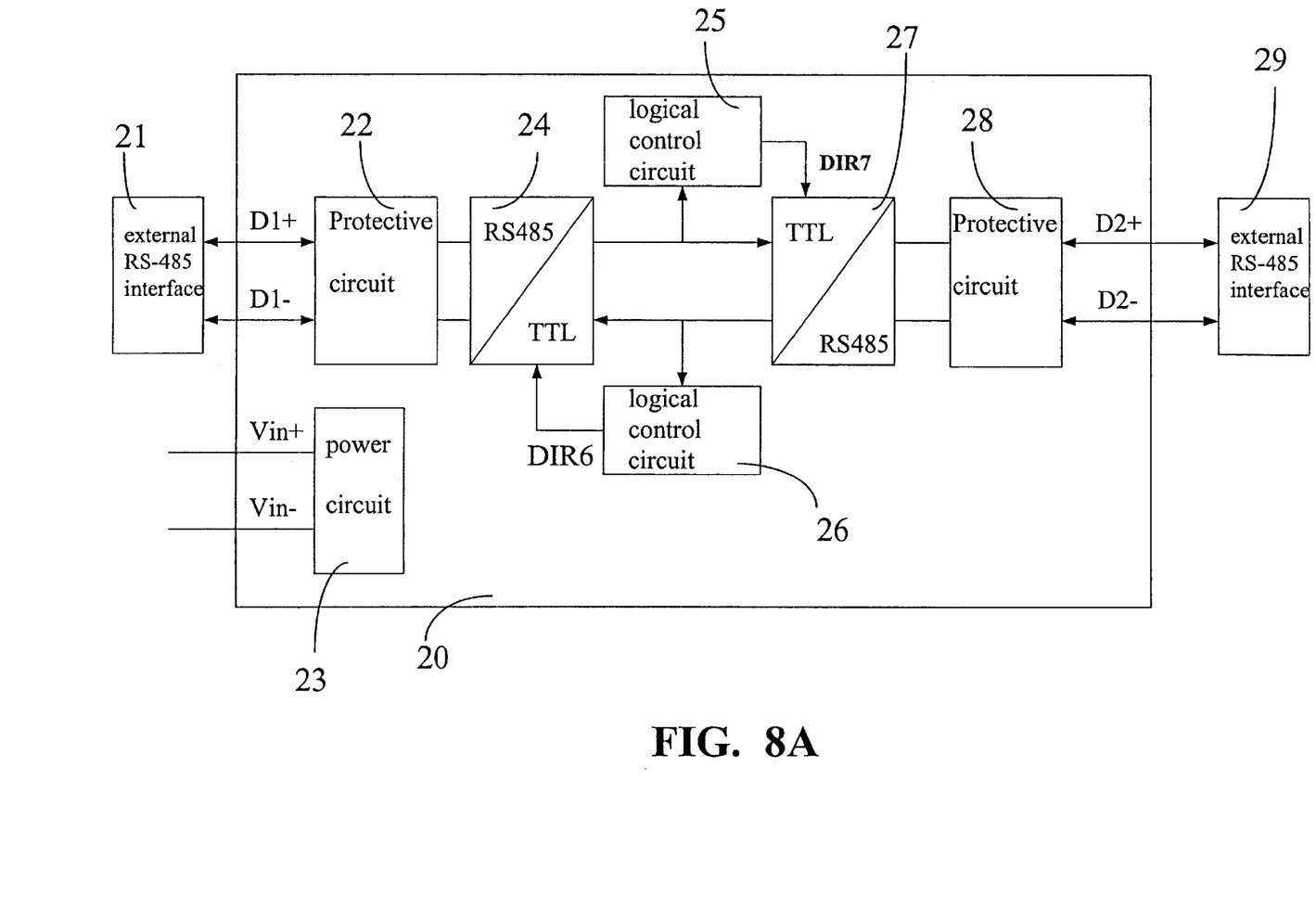
FIGS. 8A and 8B shows the block diagrams and the signal sequences of the repeater in the present invention.
Figure 8B:
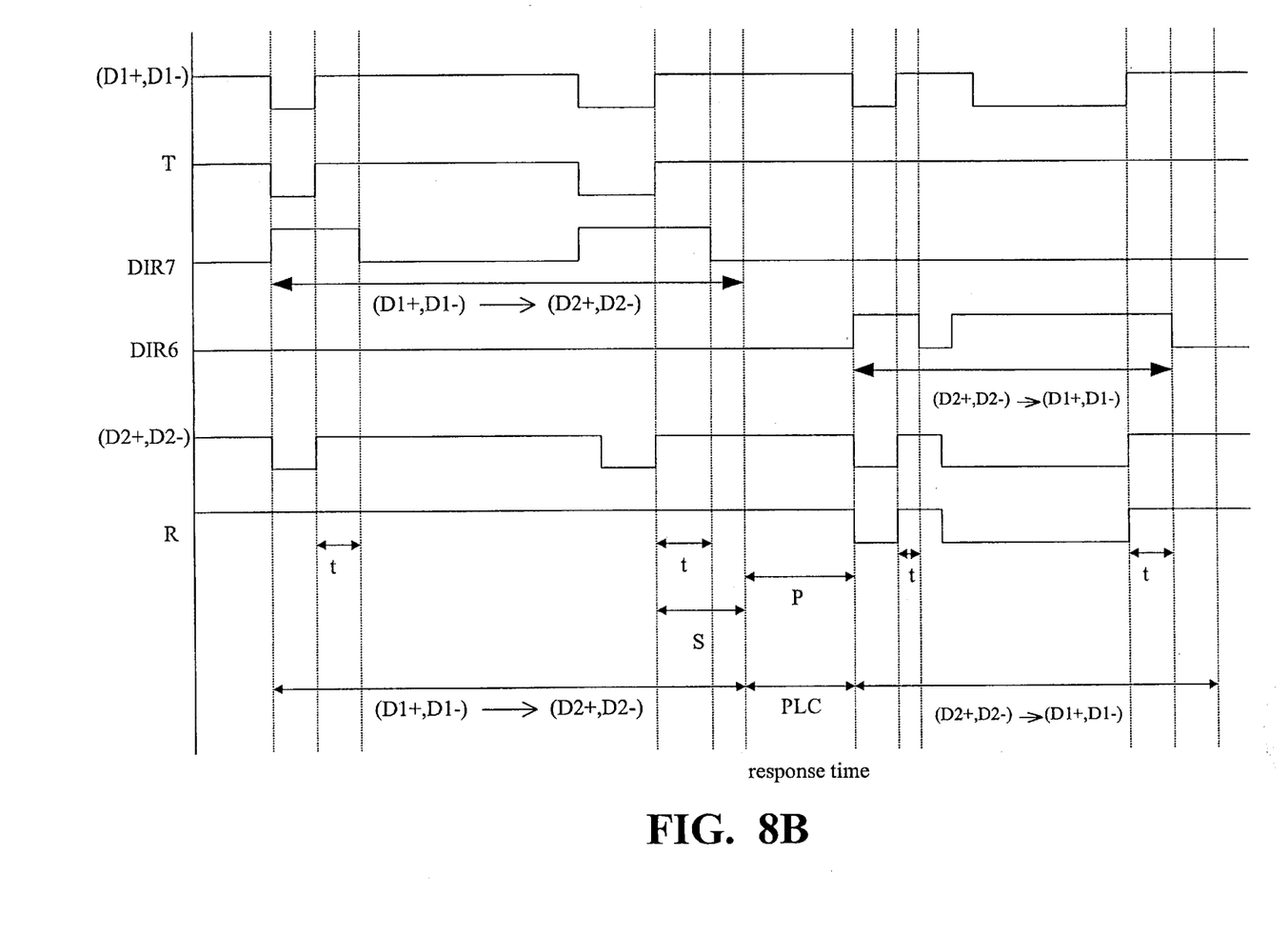

FIGS. 8A and 8B shows the block diagrams and the signal sequences of the repeater in the present invention. The operation principle is the same as that in FIGS. 6A and 6B. Signal repeater 20 in the block diagram is used between two-wire RS-485. When PLCs are far apart from each other, signal repeater 20 can extend the RS-485 network and increase signal strength. Signal repeater 20 used for long distance networking comprises protective circuit 22, power circuit 23, RS-485/TTL interface circuit 24, logical control circuit 25, 26, TTL/RS-485 interface circuit 27, protective circuit 28. The repeater is used to enhance each external RS-485 interface signal. Power circuit 23 transforms the external power (Vin+, Vin−) to the power needed by the hardware. Protective circuit 22 and 28 connect external RS-485 interface 21 and external RS-485 interface 29 respectively so that noise, shock, and overload can be prevented. RS-485/TTL interface circuit 24 connects protective circuit 22, logical control circuit 25, 26, and TTL/RS-485 interface circuit 27. It is used to convert the RS-485 signal on D1+ and D1− to the TTL signal on T in order to work with logical control circuit 25 which control the signal in the receiving/transmission signal control wire DIR7, based on the data in T. TTL/RS-485 interface circuit 27 which connects RS-485/TTL interface circuit 24, logical control circuit 25, 26 and protective circuit 28 is used to transform the external RS-485 signal on (D2+, D2−) to TTL interface signal on R so that logical control circuit 26 can control receiving/transmission signal control wire DIR6, based on the interface signal in R.

Rules of the receiving/transmission signal control wire DIR6 are:
Rule on starting transmission: at the starts, the sequence in the receiving/transmitting data control line (DIR6) is LOW;
Rule on transmission of LOW: when transmitting LOW signals, that is when the sequence of (D2+, D2−) changes from HIGH to LOW, the sequence in the receiving/transmitting data control line (DIR6) goes from LOW to HIGH;
Rule on transmission of HIGH: when transmitting HIGH signals, that is when the sequence of (D2+, D2−) changes from LOW to HIGH, the sequence in the receiving/transmitting data control line (DIR6) goes from HIGH to LOW after a time delay t.

Rules of the receiving/transmission signal control wire DIR7 are:
Rule on starting transmission: when starts, the sequence in the receiving/transmitting data control line (DIR7) is LOW;
Rule on transmission of LOW: when transmitting LOW signals, that is when the sequence of (D1+, D1−) changes from HIGH to LOW, the sequence in the receiving/transmitting data control line (DIR7) goes from LOW to HIGH;
Rule on transmission of HIGH: when transmitting HIGH signals, that is when the sequence of (D1+, D1−) changes from LOW to HIGH, the sequence in the receiving/transmitting data control line (DIR7) goes from HIGH to LOW after a time delay t.

It is obvious that the transmission rules for the receiving/transmission signal control wire DIR5 in FIGS. 6A, 6B and DIR6, DIR7 in FIGS. 8A, 8B are exactly the same. The maximum and the minimum value of t are also the same.

The most important advantage of the present invention is the controlling method which is totally different from the traditional one but can complete the job never before. In the data sheet of RS-485 interface IC, there is clear specification that data receiving is active when the receiving/transmission signal control wire DIR is in LOW and data transmission is active when in HIGH. In the present invention, the receiving/transmission signal control wire DIR goes from HIGH to LOW to HIGH and to LOW alternatively, which violates the traditional control method. RS-485 networking has been used for years, but none of the documentation shows the similar idea as in the present invention. In practical application, PLCs from different manufacturers do use different communication speed or configuration. Therefore, the present invention is practical, brand new, and advanced.

The present invention can not only apply in PLC connections, but also instruments or equipments meet the following requirements:
1. With RS-232 interface, do not send out signals unless being requested.
2. When receiving incorrect instructions, do not send out error messages unless requested.

Instruments or equipment qualified can be placed in the position where the PLCs are in FIG. 3 and get connected. The operation principle is identical to that of PLC connections. The present invention can be used not only for PLC connections.

Figure 9A:
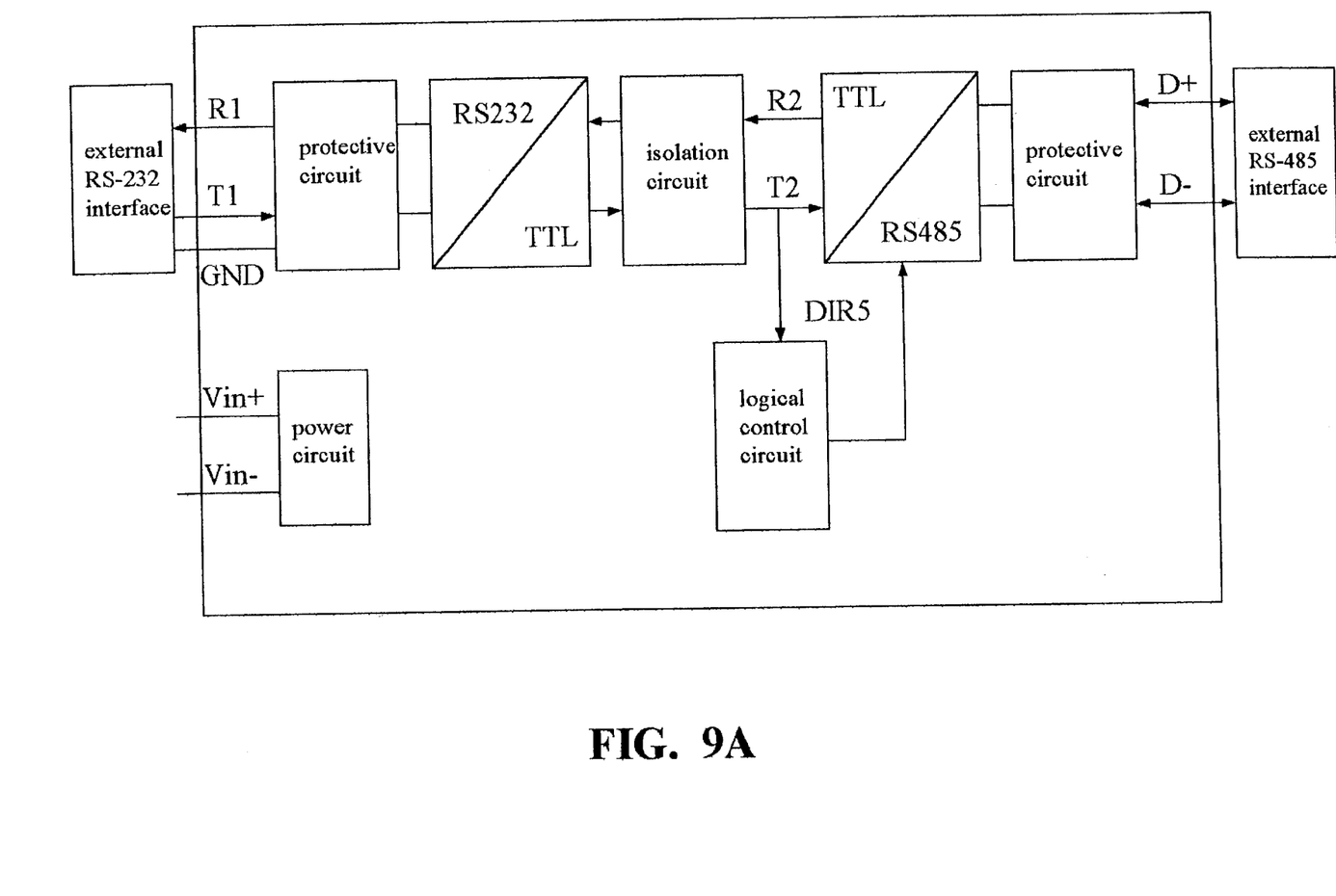
FIG. 9A shows the block diagrams of the isolated-typed converter in the present invention.
Figure 9B:
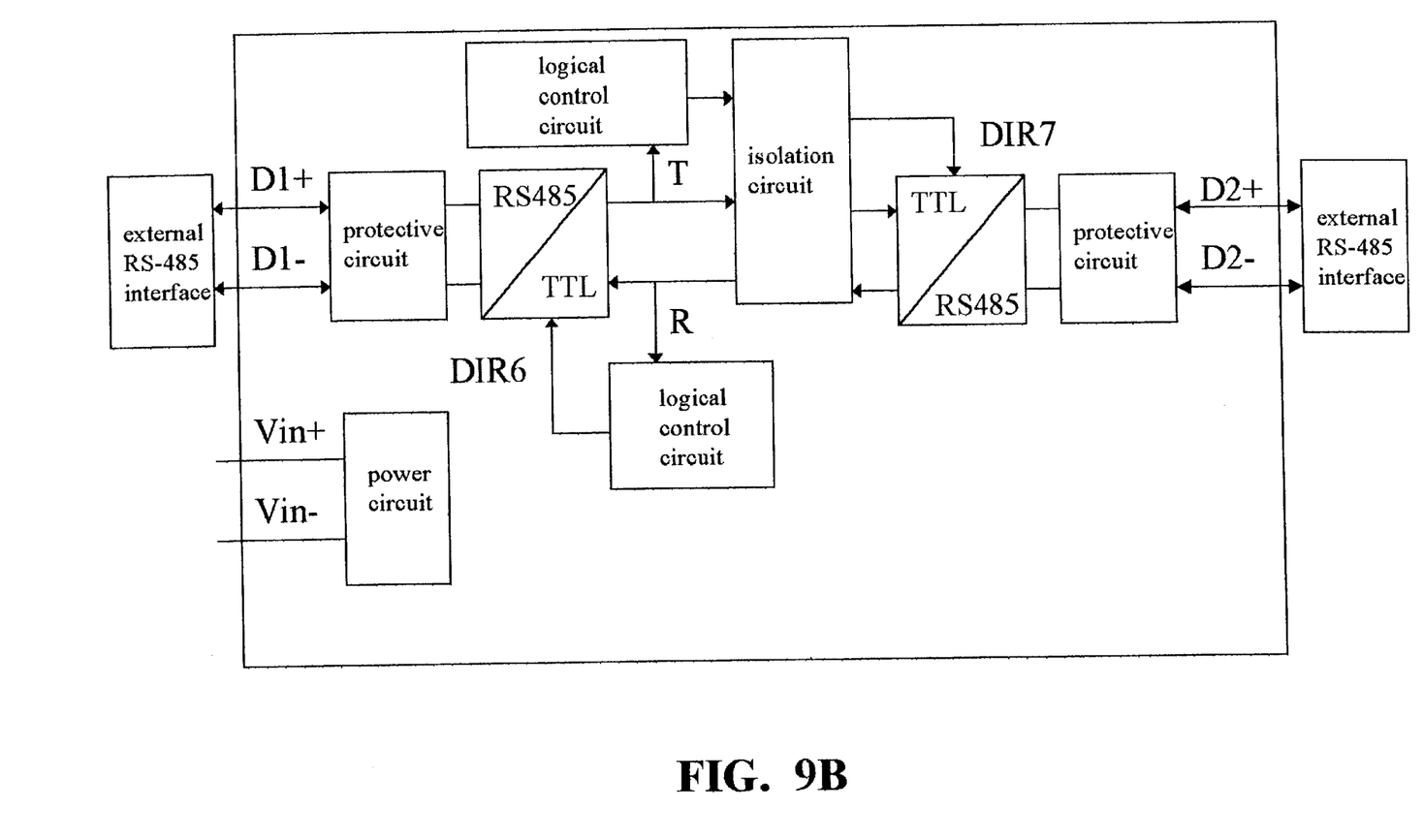
FIG. 9B shows the block diagrams of the isolated-typed repeater in the present invention.

FIG. 9A shows the block diagrams of the isolated-typed converter in the present invention. It correspond substantially to the block diagram in FIG. 6A with an isolation circuit. FIG. 9B shows the block diagrams of the isolated-typed repeater in the present invention. It correspond substantially to the block diagram in FIG. 8A with an isolation circuit.

FIGS. 10A and 10B shows the specifications of the traditional RS-485 interface IC. In order to identify the differences from the RS-485 interface IC shown in FIG. 4, a comparison is shown:

| | transmit RS-485 signal | receive RS-485 signal | RS-485 receiving/ transmission signal control | RS-485 positive differential signal | RS-485 negative differential signal |
|---|---|---|---|---|---|
| figure 4 | T | R | DIR | D+ | D− |
| figure 10 | DI | DO | RE & DE | A | B |

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:
1. A method for half-duplex serial signal control with multiple baud rates and multiple configurations for a network that includes a power circuit, a protective circuit, an RS-232 interface circuit, an RS485 interface circuit and a logical control circuit; wherein said method controls activity in a receiving/transmitting signal control line (DIR) on the RS-485 interface circuit and comprises:
starting transmission with a T1 sequence when the receiving/transmitting data control line is LOW;
transmitting LOW signals, when the T1 sequence changes from HIGH to LOW, so that a sequence in the receiving/transmitting data control line (DIR) goes from LOW to HIGH;

transmitting HIGH signals, when the T1 sequence changes from LOW to HIGH, so that the sequence in the receiving/transmitting data control line (DIR) goes from HIGH to LOW upon the expiration of a time delay t following every change of the T1 sequence from HIGH to LOW; and holding the receiving/transmitting signal control line (DIR) LOW while the network is receiving signals.

2. The method of claim 1, wherein time delay t is equal to or larger than a driver propagation delay (tPLH) value of the RS-485 interface circuit.

3. The method of claim 1, wherein the maximum value of time delay t is s+p, where s is the length of the stop bit and p is a response time of networking equipment with which communication occurs through the protective circuit, the RS-232 interface circuit and the RS-485 interface circuit.

4. A device for half-duplex serial signal control with multiple baud rates and multiple configurations, wherein a signal converter therein comprises:

a power circuit that transforms external power into power needed by hardware of said device;

a first protection circuit and a second protective circuit that connect an external RS-232 interface and an external RS-485 interface to each other;

a logical control circuit;

a TTL/RS-485 interface circuit;

an RS-232/TTL interface circuit that connects the first protective circuit, the logical control circuit, and the TTL/RS-485 interface circuit to convert an RS-232 interface signal to a TTL signal;

the TTL/RS-485 interface circuit connecting said RS-232/TTL interface circuit, said logical control circuit, and said second protective circuit to transform a TTL interface signal to a RS-485 interface signal; and a receiving/transmission signal control line;

wherein the logical control circuit connects said RS-232/TTL interface circuit and said TTL/RS-485 interface circuit to control the signal in the receiving/transmission signal control line, based on a T interface signal T2;

wherein at start-up, a sequence in the receiving/transmitting data control line is LOW;

wherein when a sequence of T1 changes from HIGH to LOW, the sequence in the receiving transmitting data control line goes from LOW to HIGH;

wherein when the sequence of T1 changes from LOW to HIGH, the sequence in the receiving/transmitting data control line goes from HIGH to LOW after a time delay t; and wherein, while the device is receiving signals, the receiving/transmission signal control line remains LOW.

5. The method and device of claim 4, wherein time interval t is equal to or larger than the driver propagation delay (tPLH) value of the RS-485 interface circuit.

6. The device of claim 4, wherein the time interval t has a maximum value of s+p, where s is the length of the stop bit and p is a response time of networking equipment with which the device communicates through the external RS-485 interface.

7. A device for half-duplex serial signal control with multiple baud rates and multiple configurations, wherein a signal repeater therein comprises:

a power circuit that transforms the external power to power needed by hardware of said device;

first and second protective circuits that connect a first external RS-485 interface and a second external RS-485 interface;

first and second logical control circuit;

a TTL/RS-485 interface circuit;

an RS-485/TTL interface circuit that connects the first protective circuit, the first logical control circuit, and the TTL/RS485 interface circuit to convert an RS485 interface signal to a TTL signal;

a first receiving/transmission signal control line; and a second receiving/transmission signal control line;

wherein the TTL/RS-485 interface circuit is connected to the RS-485/TTL circuit and transforms a TTL interface signal to a RS-485 interface signal;

wherein the first and second logical control circuits are connected respectively to the RS-485/TTL interface circuit and the TTL/RS-485 interface circuit and respectively control the signal in said first receiving/transmission signal control line and the signal in said second receiving/transmission signal control line, based on an R line interface signal;

wherein, for operation of said first receiving/transmission signal control line:

when starting, a sequence in said first receiving/transmitting data control line is LOW, when the sequence of (D2+,D2−) changes from HIGH to LOW, the sequence in said first receiving/transmitting data control line goes from LOW to HIGH, when the sequence of (D2+,D2−) changes from LOW to HIGH, the sequence in said first receiving/transmitting data control line goes from HIGH to LOW after a time delay of a length t, and when receiving, said first receiving/transmission signal control line remains LOW, and wherein, for operation of said second receiving/transmission signal control line:

when starting, said second sequence in the receiving/transmitting data control line is LOW, when the sequence of (D1+, D1−) changes from HIGH to LOW, the sequence in said second receiving/transmitting data control line goes from LOW to HIGH, when the sequence of (D1+, D1−) changes from LOW to HIGH, the sequence in said second receiving/transmitting data control line goes from HIGH to LOW after a time delay t, and when the device is receiving signals, said second receiving/transmission signal control line remains LOW.

8. The device of claim 7, wherein the time interval t is equal to or larger than a driver propagation delay (tPLH) value of the RS-485 interface circuit.

9. The device of claim 7, wherein the time interval t has maximum value of s+p, where s is the length of the stop bit and p is a response time of networking equipment with which the device communicates through the external RS-485 interface.

10. The method of claim 2, wherein the time delay t has maximum value of s+p, wherein s is the length of the stop bit and p is a response time of networking equipment with which communication occurs through the protective circuit, the RS-232 interface circuit and the RS-485 interface circuit.

11. The device of claim 5, wherein the time interval t has maximum value of s+p, where s is the length of the stop bit and p is the response time of networking equipment with which the device communicates through the external RS-485 interface.

12. The device of claim 8, wherein the time interval t has maximum value of s+p, where s is the length of the stop bit and p is a response time of networking equipment with which the device communicates through the external RS-485 interface.

* * * * *